(12) United States Patent
Zhou (10) Patent No.: US 7,253,922 B2
(45) Date of Patent: Aug. 7, 2007

(54) MONOCHROMATIC PRINTER AND IMAGE PROCESSING APPARATUS

(75) Inventor: Shixin Zhou, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 960 days.

(21) Appl. No.: 10/093,901

(22) Filed: Mar. 7, 2002

(65) Prior Publication Data

US 2002/0163655 A1 Nov. 7, 2002

(30) Foreign Application Priority Data

Mar. 7, 2001 (JP) ............................. 2001-063548

(51) Int. Cl.
*B41J 1/00* (2006.01)
*B41J 2/205* (2006.01)
*G06F 15/00* (2006.01)

(52) U.S. Cl. ..................... 358/1.9; 358/1.1; 358/1.4; 347/15; 347/40; 347/43; 347/131; 347/254

(58) Field of Classification Search ................ 358/1.9, 358/502, 521, 1.1, 1.4; 347/15, 41, 43, 12, 347/40, 131, 254
See application file for complete search history.

(56) References Cited

U.S. PATENT DOCUMENTS

| | | | | |
|---|---|---|---|---|
| 5,032,851 A | * | 7/1991 | Yoshimura | .................... 347/15 |
| 6,089,691 A | * | 7/2000 | Kakutani | ..................... 347/15 |
| 6,164,747 A | | 12/2000 | Yashima et al. | |
| 6,554,384 B1 | * | 4/2003 | Tanaka | ......................... 347/15 |

FOREIGN PATENT DOCUMENTS

| | | |
|---|---|---|
| JP | 04-347642 | 12/1992 |
| JP | 10-129014 | 5/1998 |
| JP | 10-181000 | 7/1998 |
| JP | 11-320924 | 11/1999 |

OTHER PUBLICATIONS

Abstract of Japanese Patent Publication No. 04-347642, Pub. Date: Dec. 2, 1992, Patent Abstracts of Japan.
Abstract of Japanese Patent Publication No. 10-129014, Pub. Date: May 19, 1998, Patent Abstracts of Japan.
Abstract of Japanese Patent Publication No. 10-181000 Pub. Date: Jul. 7, 1998, Patent Abstracts of Japan.
Abstract of Japanese Patent Publication No. 11-320924, Pub. Date: Nov. 24, 1999, Patent Abstracts of Japan.

* cited by examiner

*Primary Examiner*—Kimberly Williams
*Assistant Examiner*—Charlotte M. Baker
(74) *Attorney, Agent, or Firm*—Martine Penilla & Gencarella, LLP (57) ABSTRACT

A printing apparatus is provided with multiple achromatic color inks having different densities and at least one chromatic color ink. Diversity of dots are created with the multiple achromatic color inks on a printing medium according to image data to form a black and white image where dots are inconspicuous. Dots of the at least one chromatic color ink are created according to lightness of an image to be mixed with the dots of at least one of the multiple achromatic color inks. This technique gives a high-quality monochromatic image with hue, where dots are inconspicuous. In the case of the printing apparatus provided with multiple chromatic color inks, a ratio of densities of these multiple chromatic color inks to one another is set to express a high-quality monochromatic image with desired hues. The printing apparatus provided with three different color inks, cyan, magenta yellow, as the multiple chromatic color inks, enables color images to be printed.

12 Claims, 10 Drawing Sheets

MONOCHROMATIC PRINTER AND IMAGE PROCESSING APPARATUS

BACKGROUND OF THE INVENTION

1. Field of the Invention

The present invention relates to a technique of displaying a high-quality monochromatic image.

2. Description of the Related Art

Color printers have been widely used to create ink dots with respective color inks and print a color image on a printing medium. A diversity of techniques related to the color printer have been developed to meet the demand of high picture quality. At present, the developed technique can print color images of significantly high picture quality.

In general, a monochromatic image does not include information regarding the hue, but has a higher density resolving power and, in this sense, a richer expressive power than those of the color image. The monochromatic image is thus still popular even in the present state attaining the high picture quality of the color printer. The monochromatic image reminds people of an old photograph and gives a unique touch to the expression. In some cases, the color image is thus intentionally converted into a monochromatic image for printing.

In the present state attaining the high picture quality of the color printer, the image printed with a conventional monochromatic printer has relatively poorer picture quality than that of the printed image with the color printer.

SUMMARY OF THE INVENTION

The object of the present invention is thus to solve the drawbacks of the prior art technique described above and to provide a technique of expressing a monochromatic image having a higher picture quality.

At least part of the above and the other related objects is attained by a printing apparatus having the following construction. The present invention is accordingly directed to a printing apparatus that is provided with multiple achromatic color inks having different densities and creates a diversity of dots with the multiple achromatic color inks on a printing medium according to image data, thus printing a monochromatic image, said printing apparatus comprising:

a chromatic color ink receiver that receives at least one chromatic color ink; and a chromatic color dot creation module that creates dots with the at least one chromatic color ink at a predetermined density according to lightness information included in the image data to be mixed with the dots of at least one of the multiple achromatic color inks.

In the printing apparatus of the above construction, in the process of creating dots of the multiple achromatic color inks having different densities to print a monochromatic image, the technique creates dots of the chromatic color ink at the predetermined density according to the lightness of the image to be mixed with the dots of the achromatic color inks. Creation of the dots with the chromatic color ink in addition to the dots with the achromatic color inks applies the hue according to the lightness of the image and thus ensures expression of a higher-quality monochromatic image.

In accordance with one preferable application, the printing apparatus is provided with a first chromatic color ink and a second chromatic color ink having different hues. The procedure creates dots with the first chromatic color ink and dots with the second chromatic color ink, such that a ratio of a density of the dots with the first chromatic color ink to a density of the dots with the second chromatic color ink is substantially fixed.

Creation of dots with the first chromatic color ink and dots with the second chromatic color ink at the substantially fixed density ratio desirably enables the hue to be homogeneously applied to the monochromatic image.

In the specification hereof, the monochromatic image represents an image having a single hue, and is not restricted to the image printed with a single ink. For example, the image of a single hue obtained by creating dots of multiple inks at a substantially identical rate corresponds to the monochromatic image in this specification.

The first chromatic color ink and the second chromatic color ink may be magenta ink and yellow ink. This arrangement desirably allows a monochromatic image with a sepia or warm touch to be printed.

Alternatively the first chromatic color ink and the second chromatic color ink may be magenta ink and cyan ink. This arrangement desirably allows a monochromatic image with a cool touch to be printed.

In the printing apparatus of the present invention, the at least one chromatic color ink may include cyan ink, magenta ink, and yellow ink.

Creation of dots with these inks at an adequate ratio in addition to the dots of the achromatic color inks preferably enables a diversity of hues to be applied to the monochromatic image. The printing apparatus is also capable of printing a color image by creating dots of the respective color inks, cyan, magenta, and yellow, to be mixed with one another.

The printing apparatus may further be provided with three achromatic color inks having different densities, in addition to the cyan ink, the magenta ink, and the yellow ink.

Creation of dots with these multiple achromatic color inks preferably makes the dots relatively inconspicuous in a resulting image. Creation of dots with the cyan ink, the magenta ink, and the yellow ink in addition to the dots of these achromatic color inks preferably ensures a high-quality, monochromatic printed image with a desired hue applied thereto.

Mixed creation of substantially equal quantities of dots with the cyan ink, dots with the magenta ink, and dots with the yellow ink enables expression of a monochromatic image. The monochromatic image expressed by mixed creation of these dots may, however, have a metameric problem where an unintentional hue appears on the image according to the type of the light source. There is also a problem of color twist where an unintentional hue appears in a part of the monochromatic image having different densities of cyan dots, magenta dots, and yellow dots. The printing apparatus discussed above expresses the monochromatic image with dots of the multiple achromatic color inks and thus ensures expression of a high-quality monochromatic image without causing the metameric problem and the problem of color twist.

In the above application, the printing apparatus is provided with a total of six different inks, that is, the three achromatic color inks in addition to the three chromatic color inks, that is, the cyan ink, the magenta ink, and the yellow ink. The arrangement of using the total of six different inks enables a high-quality monochromatic image to be readily printed by simply replacing six color inks used in a six-color printer, that is, cyan ink, magenta ink, yellow ink, black ink, light cyan ink having a lower density, and light magenta ink having a lower density, with these six different inks.

In the printing apparatus of the present invention, the number of the multiple achromatic color inks may be equal to or greater than the number of chromatic color inks.

The arrangement of providing a large number of inks and adequately creating dots with these inks enables a high-quality image to be printed. The greater number of inks, however, requires a larger space for keeping these inks therein and makes the printing apparatus undesirably bulky. The increase in number of inks accordingly has a restriction. Setting the number of the achromatic color inks equal to or greater than the number of the chromatic color inks under such restriction efficiently improves the quality of the image.

At least part of the drawbacks of the prior art technique is solved by an image processing apparatus having the following construction. The present invention is thus directed to an image processing apparatus that converts image data into an expression format based on on-off state of various types of dots, said image processing apparatus comprising:

an achromatic color dot creation determination module that determines on-off state of multiple types of achromatic color dots having different densities, based on the image data; and a chromatic color dot creation module that creates at least one type of chromatic color dots at a predetermined density according to lightness information included in the image data to be mixed with the multiple types of achromatic color dots.

There is an image processing method corresponding to the above image processing apparatus. The present invention is accordingly directed to an image processing method that converts image data into an expression format based on on-off state of various types of dots. The image processing method includes the steps of: determining on-off state of multiple types of achromatic color dots having different densities, based on the image data; and creating at least one type of chromatic color dots at a predetermined density according to lightness information included in the image data to be mixed with at least one of the multiple types of achromatic color dots.

In the image processing apparatus and the corresponding image processing method, the technique converts the image data into the expression format based on the on-off state of the multiple types of achromatic color dots having different densities, and creates the chromatic color dots at a predetermined density according to lightness of the image.

Creation of the various types of dots on the printing medium based on the converted image data preferably ensures expression of a high-quality monochromatic image with a desired hue applied thereto.

In accordance with one preferable application, the image processing apparatus creates first chromatic color dots and second chromatic color dots having different hues, such that a ratio of a density of the first chromatic color dots to a density of the second chromatic color dots is substantially fixed. Creation of the various types of dots on the printing medium based on the resulting image data desirably ensures expression of a monochromatic image with a color homogeneously applied thereto.

In the image processing apparatus of this application, the technique may set the ratio of the density of the first chromatic color dots to the density of the second chromatic color dots and create the first chromatic color dots and the second chromatic color dots at the setting of the density ratio.

Creation of the various types of dots based on the resulting image data enables the color applied to the monochromatic image to be changed according to the setting of the density ratio.

In accordance with another preferable application, the image processing apparatus specifies a setting of the predetermined density, at which the at least one type of chromatic color dots are created, according to lightness of the image. Creation of the various types of dots based on the resulting image data enables the degree of color application to the monochromatic image to be varied according to the specified setting of the predetermined density.

In accordance with still another preferable application, the image processing apparatus of the present invention sets a ratio of a density of cyan dots, a density of magenta dots, and a density of yellow dots to one another, and creates the cyan dots, the magenta dots, and the yellow dots at the setting of the ratio.

Combination of the cyan dots, the magenta dots, and the yellow dots enables expression of diverse colors. Creation of the various types of dots on the printing medium based on the resulting image data preferably ensures expression of a high-quality monochromatic image with a desired hue applied thereto.

The image processing method of the present invention may be executed by a computer which a program for attaining predetermined functions is stored therein. There are accordingly other applications of the present invention. One application is a computer program product corresponding to the image processing method of the present invention. The present invention is thus directed to a computer program product that converts image data into an expression format based on on-off state of various types of dots. The computer program product has: a recording medium in which data is recorded in a computer readable manner; and a computer program recorded in the recording medium. The computer program includes program codes of: determining on-off state of multiple types of achromatic color dots having different densities, based on the image data; and creating at least one type of chromatic color dots at a predetermined density according to lightness information included in the image data to be mixed with at least one of the multiple types of achromatic color dots.

Another application is a program corresponding to the image processing method of the present invention. The present invention is accordingly directed to a program that causes a computer to execute a series of processing, in order to convert image data into an expression format based on on-off state of various types of dots. The program includes program codes of: determining on-off state of multiple types of achromatic color dots having different densities, based on the image data; and creating at least one type of chromatic color dots at a predetermined density according to lightness information included in the image data to be mixed with at least one of the multiple types of achromatic color dots.

The computer reads these program codes and creates various dots based on the resulting image data, thus allowing expression of a high-quality monochromatic image.

DESCRIPTION OF THE PREFERRED EMBODIMENTS

With a view to further elucidating the functions and the effects of the present invention, some modes of carrying out the present invention are discussed below in the following sequence:

A. First Embodiment

A-1. Construction of Apparatus
A-2. Image Processing
A-3. Modifications

B. Second Embodiment

B-1. Construction of Apparatus
B-2. Image Processing

A. First Embodiment

A-1. Construction of Apparatus

Figure 1:
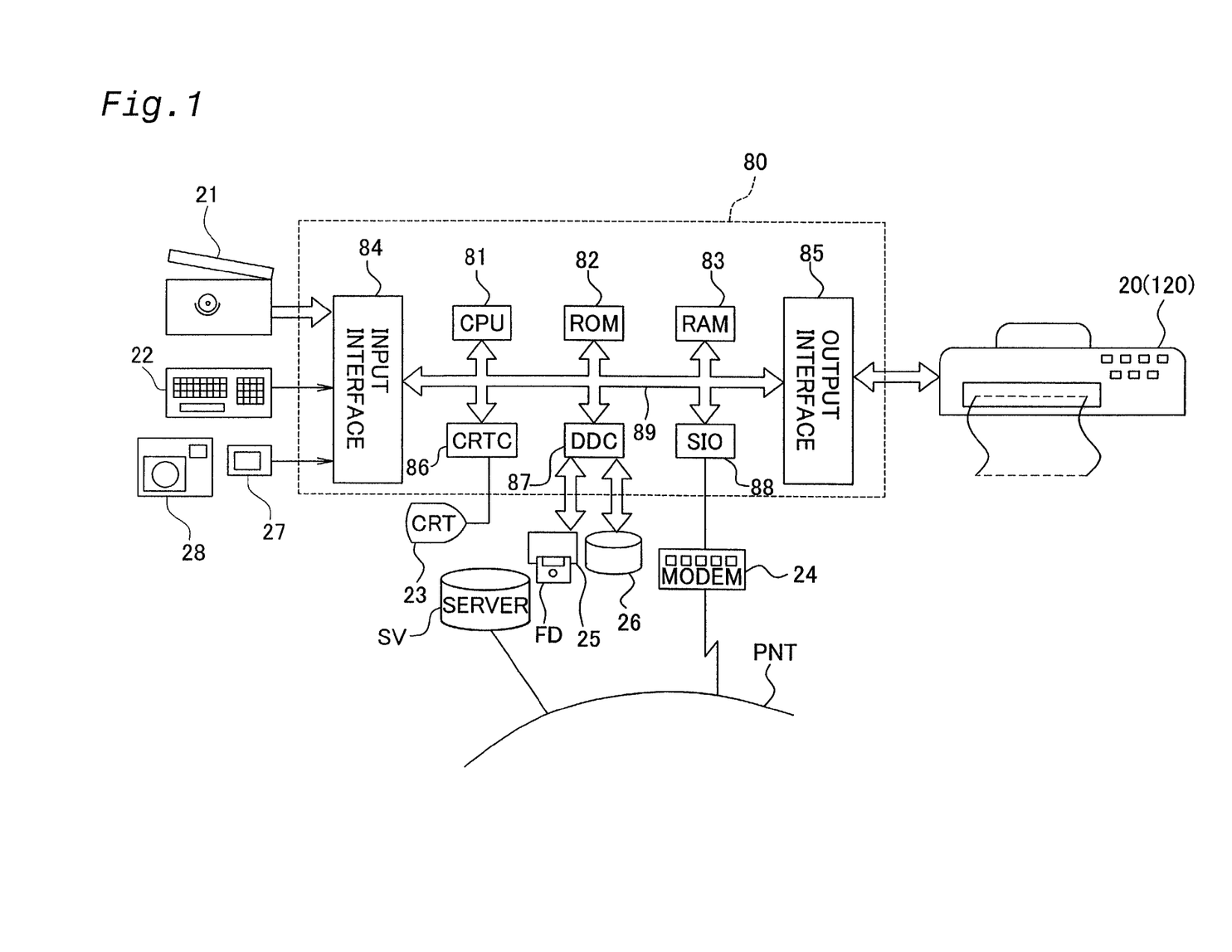
FIG. 1 schematically illustrates the construction of a printing system in one embodiment.

FIG. 1 illustrates the structure of a printing system including a printing apparatus and an image printing apparatus according to the present invention. As illustrated, this printing system includes a computer 80 connected to a printer 20. The computer 80 loads and executes a predetermined program, and functions in combination with the printer 20 as the integrated printing system. An image to be printed is generated by any of diverse application programs 91 on the computer 80. The image may otherwise be taken in by a scanner 21 connecting with the computer 80 or may be shot with a digital camera (DSC) 28 and taken in via a memory card 27. Data ORG of such an image is converted into image data in a specific form printable by the printer 20 and output as print data FNL to the printer 20 by a CPU 81 in the computer 80. The printer 20 controls creation of ink dots on printing paper according to the print data FNL. A resulting image is eventually printed on the printing paper.

The computer 80 includes the CPU 81 that executes a diversity of computing operations, a RAM 83 that temporarily stores data therein, a ROM 82 that stores a variety of programs therein, and a hard disk 26. Connection of an SIO 88 to a public telephone line PNT via a modem 24 enables required data and programs to be downloaded from a server SV on an external network into the hard disk 26.

The printer 20 is provided with a plurality of achromatic color inks having different densities and creates dots of these achromatic color inks, so as to print a high-quality monochromatic image on the printing paper. The printer 20 of this embodiment is further provided with at least one chromatic color ink in addition to the achromatic color inks and creates dots of the chromatic color ink in addition to the dots of the achromatic color inks, so as to print a monochromatic image having a higher picture quality.

The printer 20 adopts the system of utilizing piezoelectric elements to eject inks and create ink dots on the printing paper. Although the printer 20 used in this embodiment adopts the system of using piezoelectric elements for ink ejection, the printer may be provided with a nozzle unit that ejects ink by another system. For example, the technique of the present invention is applied to a printer that adopts the system of utilizing a heater disposed in each ink conduit to produce bubbles in the ink conduit and thereby cause ejection of ink droplets. Instead of the ink ejection system, the printer may adopt the system of utilizing a thermal transfer or another equivalent technique to create ink dots on the printing paper.

Figure 2:
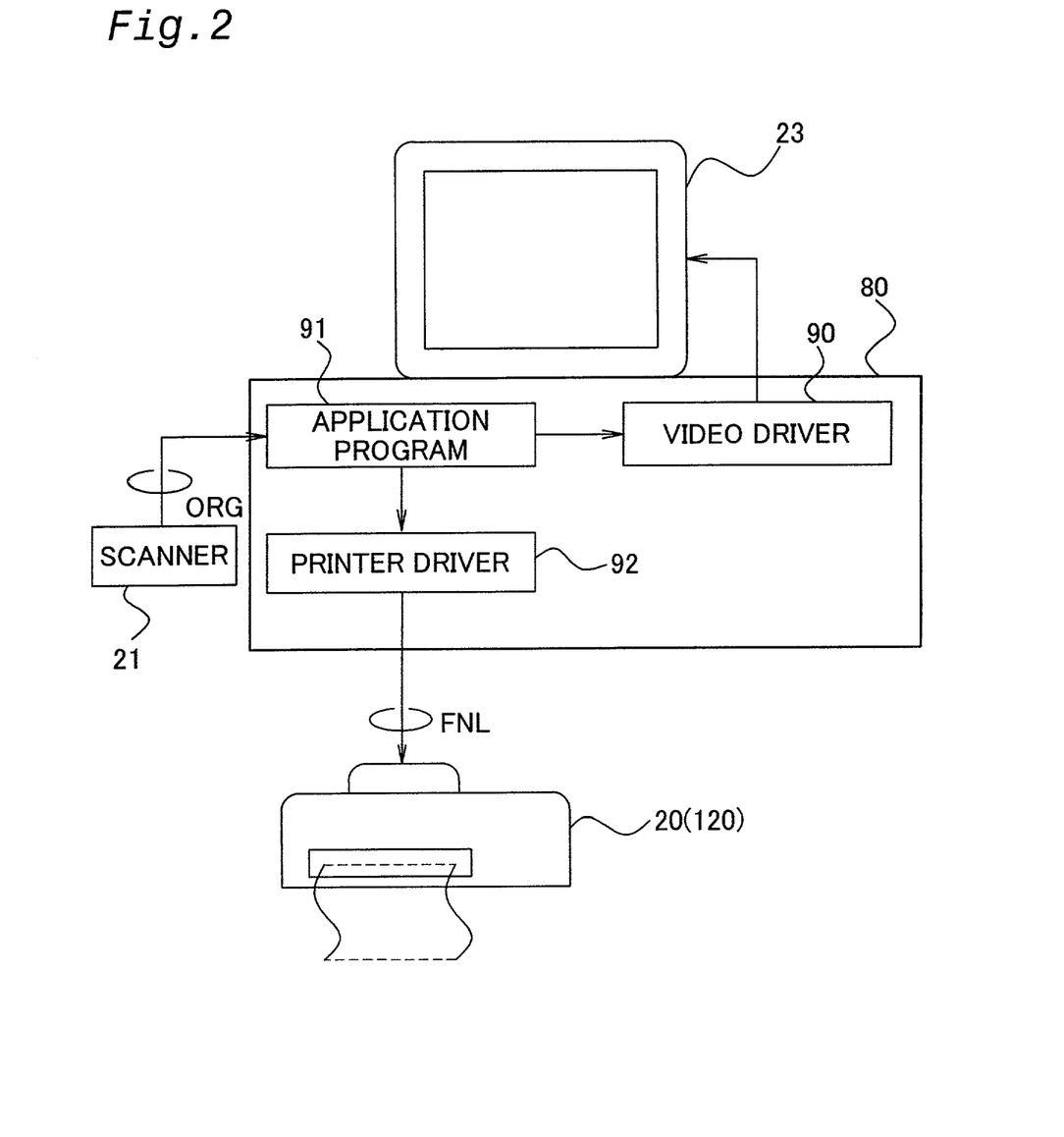
FIG. 2 shows the software configuration of a computer functioning as an image processing apparatus of the embodiment.

FIG. 2 is a block diagram conceptually showing the software configuration of the computer 80 to attain the functions of the image processing apparatus of the embodiment. In the computer 80, all application programs 91 work under an operating system. A video driver 90 and a printer driver 92 are incorporated in the operating system. Image data output from each application program 91 is subjected to a predetermined signal conversion by the video driver 90 and displayed on a monitor 23.

In response to output of a printing instruction from the application program 91, the printer driver 92 of the computer 80 receives image data from the application program 91, carries out a preset series of image processing, converts the processed image data into the print data FNL printable by the printer 20, and outputs the converted print data FNL to the printer 20. The details of the image processing will be discussed later.

Figure 3:
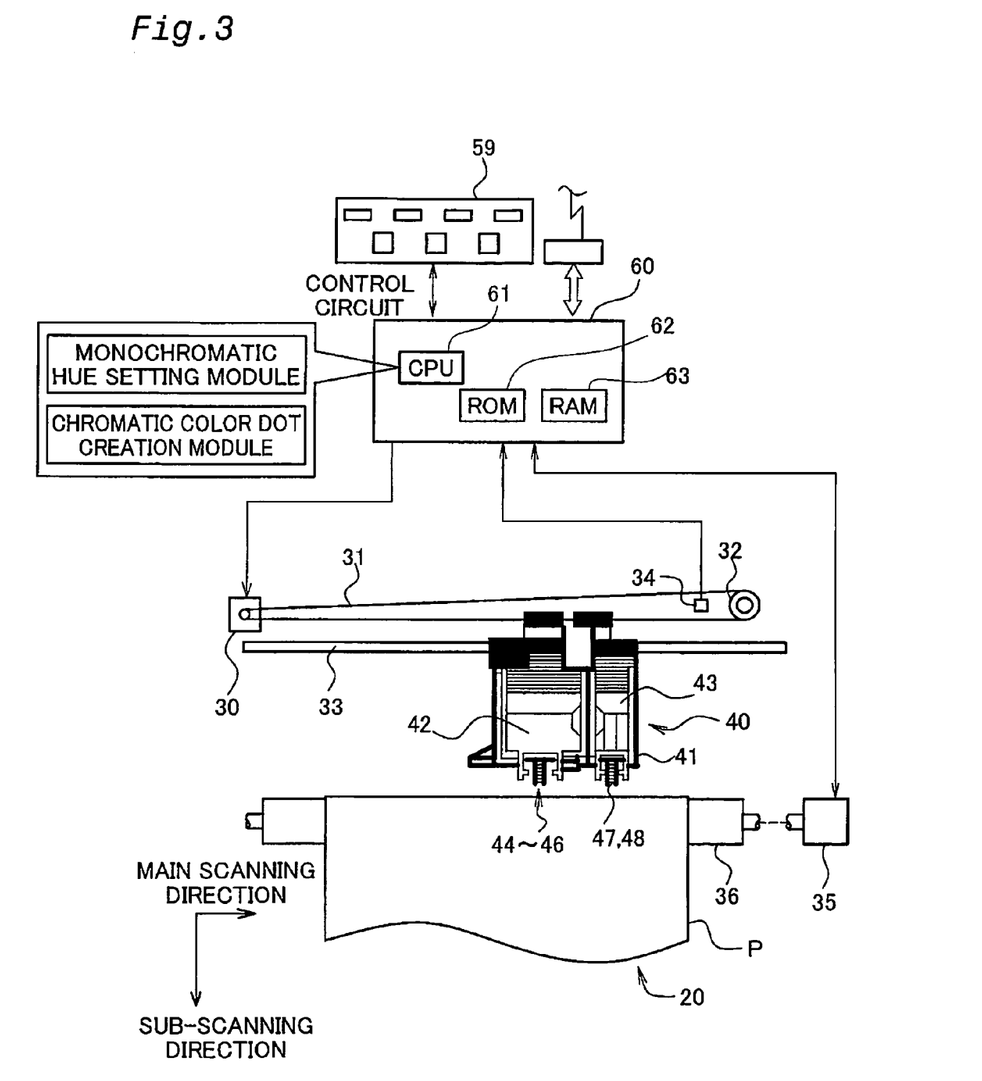
FIG. 3 schematically illustrates the structure of a printer in the embodiment.

FIG. 3 schematically illustrates the structure of the printer 20 of the embodiment. The printer 20 has a mechanism of driving a print head 41 mounted on a carriage 40 to eject ink and create dots, a mechanism of actuating a carriage motor 30 to move the carriage 40 back and forth along an axis of a platen 36, a mechanism of actuating a sheet feed motor 35 to feed a sheet of printing paper P, and a control circuit 60.

The mechanism of reciprocating the carriage 40 along the axis of the platen 36 includes a sliding shaft 33 that is arranged in parallel with the axis of the platen 36 to support the carriage 40 in a slidable manner, a pulley 32 that is combined with the carriage motor 30 to support an endless drive belt 31 spanned therebetween, and a position sensor 34 that detects the position of the origin of the carriage 40.

The mechanism of feeding the printing paper P includes the platen 36, the sheet feed motor 35 for rotating the platen 36, a nonillustrated sheet feed assist roller, and a gear train (omitted from illustration) that transmits the rotations of the sheet feed motor 35 to the platen 36 and the sheet feed assist roller. The sheet of printing paper P is set between the platen 36 and the sheet feed assist roller and is fed by a preset amount corresponding to the angle of rotation of the platen 36.

The control circuit 60 includes a CPU 61, a ROM 62, and a RAM 63 and controls the respective mechanisms of the printer 20. The control circuit 60 controls ejection of ink droplets from respective nozzles based on the image data FNL supplied from the computer 80, while controlling the operations of the carriage motor 30 and the sheet feed motor 35 to control main scan and sub-scan of the carriage 40. Ink dots are accordingly created at adequate positions on the printing paper.

An ink cartridge 42 that keeps the plurality of achromatic color inks therein and an ink cartridge 43 that keeps chromatic color inks are attached to the carriage 40. The ink cartridge 42 for the achromatic color inks has a total of three achromatic color inks, that is, black ink, gray ink having a higher lightness than that of the black ink, and light gray ink having a still higher lightness than that of the gray ink. The ink cartridge 43 for the chromatic color inks has magenta ink and yellow ink. This combination is, however, not restrictive but there may be various combinations of inks kept in ink cartridges. In one possible modification, all the inks may be kept in one identical ink cartridge. The arrangement of keeping multiple inks in one ink cartridge desirably reduces the total size of the ink cartridges. In the description below, black ink, gray ink, light gray ink, magenta ink, and yellow ink may respectively be referred to as K1 ink, K2 ink, K3 ink, M ink and Y ink.

When the ink cartridges 42 and 43 are attached to the carriage 40, the respective inks kept in the ink cartridges are led to ink ejection heads 44 through 48 for the respective colors through non-illustrated ink conduits. The inks fed to the respective ink ejection heads 44 through 48 are ejected therefrom under control of the control circuit 60.

Figure 4:
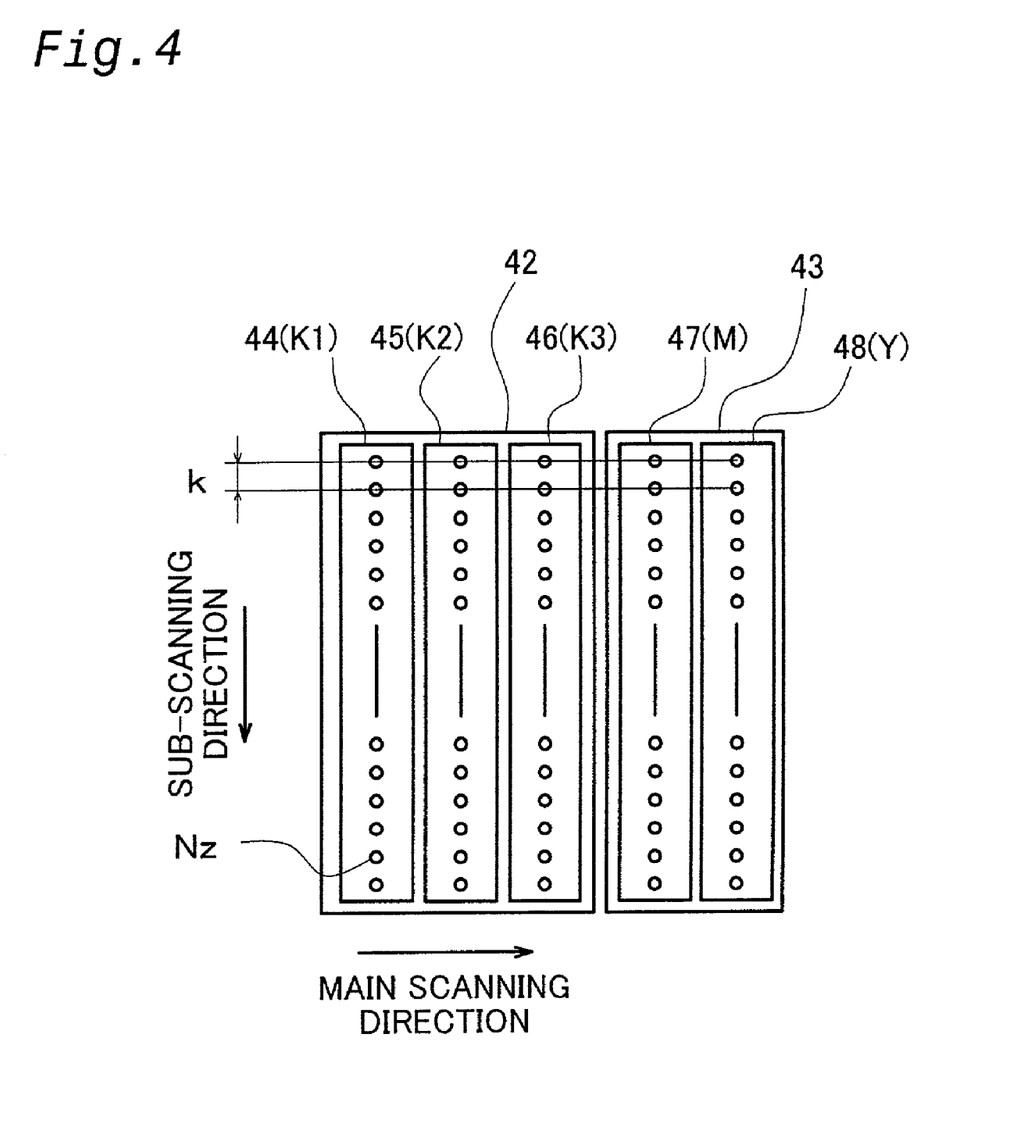
FIG. 4 shows an arrangement of nozzles in a printer of a first embodiment.

FIG. 4 shows an arrangement of ink jet nozzles Nz in the ink ejection heads 44 through 48. As illustrated, five nozzle arrays are formed in the bottom face of the respective ink ejection heads to eject the respective color inks K1, K2, K3, M, and Y. Each nozzle array include 48 nozzles Nz arranged at a fixed nozzle pitch k.

The printer 20 having the above hardware structure actuates the carriage motor 30 to move the ink ejection heads 44 through 48 for the respective colors in a main scanning direction relative to the printing paper P, while actuating the sheet feed motor 235 to shift the printing paper P in a sub-scanning direction. While the main scan and the sub-scan of the carriage 40 are repeated under control of the control circuit 60, the nozzles are driven at adequate timings to eject ink droplets. The printer 20 accordingly prints a monochromatic image on the printing paper.

A-2. Image Processing

Figure 5:
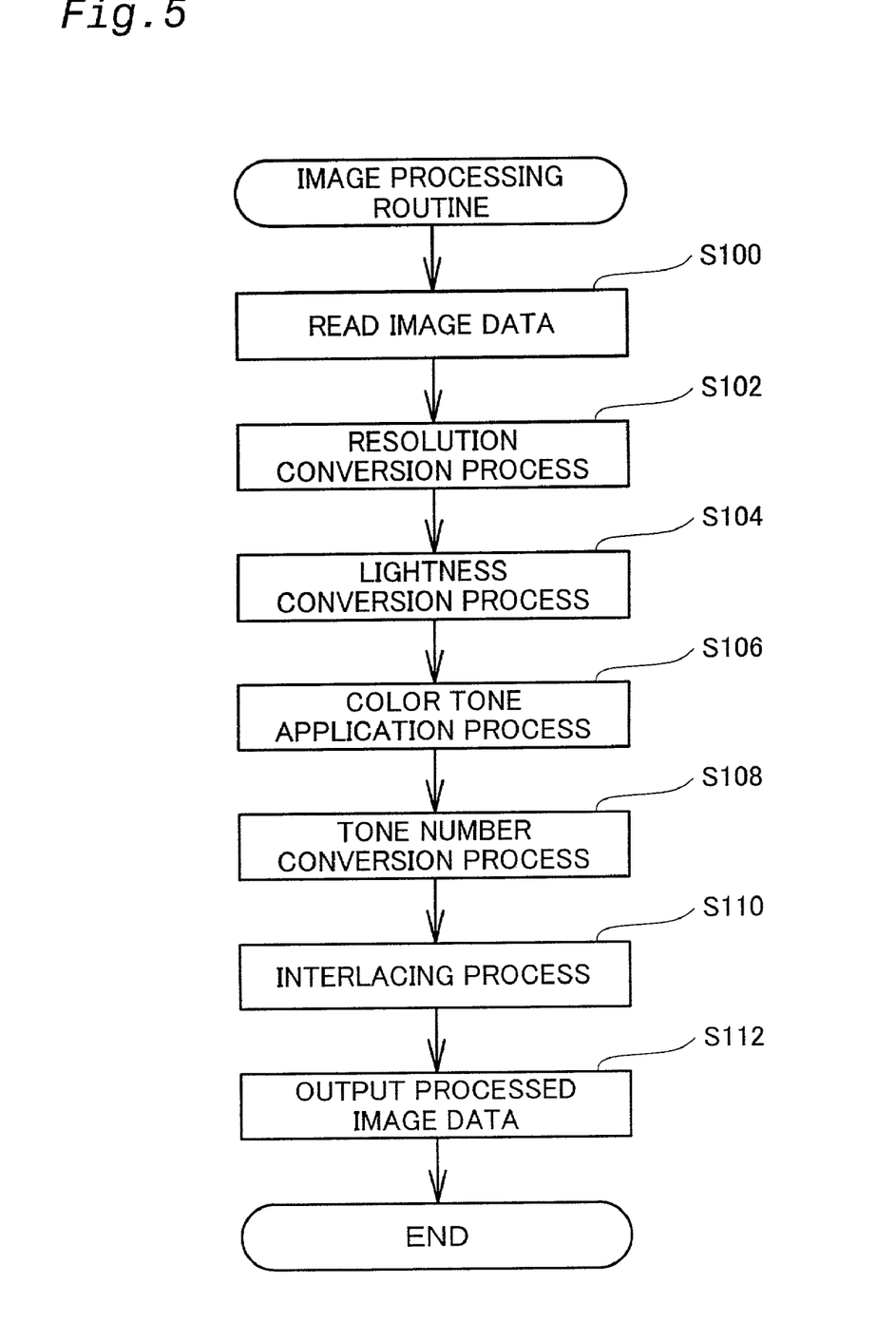
FIG. 5 is a flowchart showing an image processing routine executed in the first embodiment.

FIG. 5 is a flowchart showing a processing flow of converting input image data into print data through a preset series of image processing, which is executed by the computer 80 as the image processing apparatus of the embodiment. This processing routine starts in response to activation of the printer driver 92 by the operating system of the computer 80. The image processing routine of this embodiment is described briefly with reference to FIG. 5.

When the image processing routine starts, the printer driver 92 first reads image data of interest to be converted (step S100). The printer 20 of this embodiment prints monochromatic images, and the image data may be either of color image data and black and white image data. Here it is assumed that the input image data is RGB color image data.

The printer driver then converts the resolution of the input image data into a printing resolution used for printing with the printer 20 (step S102). When the resolution of the image data is lower than the printing resolution, linear interpolation is carried out to generate new pieces of data between adjoining pieces of image data. When the resolution of the image data is higher than the printing resolution, on the other hand, the procedure skips the existing data at a preset rate to convert the resolution of the image data into the printing resolution.

On completion of the conversion of the resolution, a lightness conversion process is carried out (step S104). The lightness conversion process first converts the image data into lightness data representing the lightness of the image and further converts the lightness data into dot density data representing the density of dot creation with regard to the respective achromatic color inks K1, K2, and K3. This procedure is discussed in detail below.

The RGB color image data read at step S100 has information regarding the color and information regarding the lightness, which are included in a dispersive manner in tone data of the respective R, G, and B colors. The procedure first extracts the lightness information included in the tone data of the respective colors and converts the image data into lightness data representing the lightness of the image. More specifically, the lightness data is obtained by summing up the tone values of the respective R, G, and B colors. The larger value of the lightness data represents the higher lightness of the image (namely the brighter image), whereas the smaller value represents the lower lightness of the image (namely the darker image). Any of other known methods may be applied for the extraction of the lightness information. One applicable technique sums up the tone values of the respective R, G, and B colors with preset different weights to generate the lightness data. The conversion process into the lightness data may be omitted when the image data read at step S100 has separate lightness data, for example, image data of a black and white image or color image data expressed in the Lab format.

Figure 6:
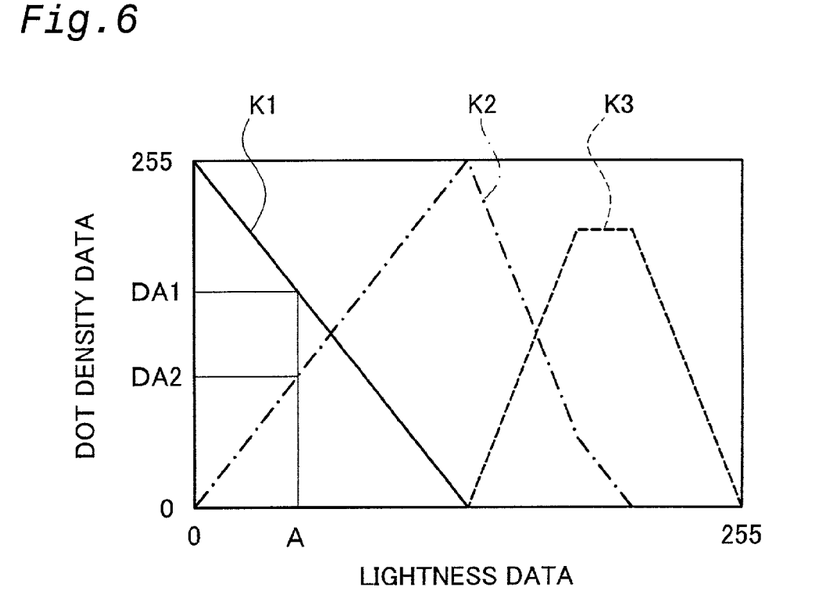
FIG. 6 conceptually shows computation of dot density data with regard to dots of achromatic color inks in the process of lightness conversion in the first embodiment.

The lightness data thus obtained is converted into dot density data with regard to the respective achromatic color inks K1 (black), K2 (gray), and K3 (light gray). The dot density data is an index regarding the density of dots per unit area. Such conversion is readily performed by referring to a conversion table called a dot density table. FIG. 6 shows conversion of lightness data into dot density data with regard to the respective achromatic color inks by referring to the dot density table.

As illustrated, the dot density data with regard to the respective achromatic color inks K1, K2, and K3 against the lightness data is set in the dot density table. The lightness data is converted into the dot density data by referring to this table. For example, the procedure of referring to the dot density table converts a tone value 'A' of the lightness data into a tone value 'DA1' of the dot density data for the K1 ink and a tone value 'DA2' of the dot density data for the K2 ink. A tone value '0' of the dot density data represents the state in which no dots are created on the printing paper. A tone value '255' of the dot density data represents the solid state in which dots are created all over the printing paper. As mentioned previously, a tone value '255' of the lightness data represents a brightest image, that is, an image of the ground color of the printing paper. A tone value '0' of the lightness data represents a darkest image, that is, an intense black image.

On completion of the lightness conversion process, the printer driver carries out a color tone application process (step S106). The color tone application process applies a preset color tone to the monochromatic image. The printer 20 of this embodiment is thus capable of printing sepia, warm, and other chromatic color-touched monochromatic images, in addition to general monochromatic images. The color and the degree of application to the monochromatic image are set prior to start of the actual printing operation. The color tone application process generates the dot density data with regard to dots of the chromatic color inks, based on such settings. The process of setting the color to be applied to the monochromatic image is described, prior to the details of the color tone application process.

Figure 7:
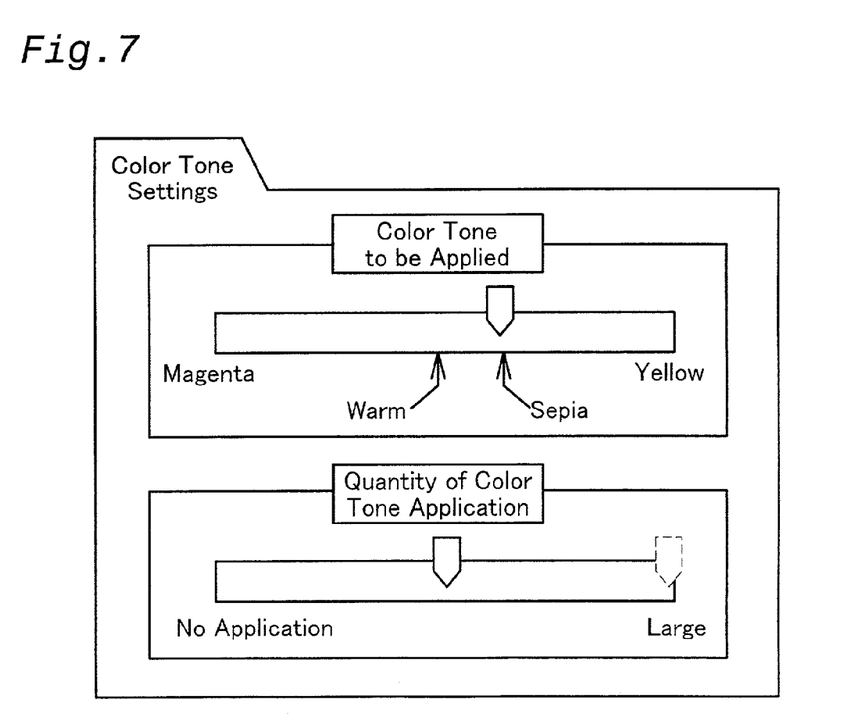
FIG. 7 shows settings of the color tone applied to a monochromatic image in the first embodiment.

The color to be applied to the monochromatic image is set in advance in the printer driver 92. FIG. 7 shows prior settings of the color application in the printer driver 92 on the monitor 23 of the computer 80. As illustrated, when a color tone setting window in the printer driver 92 opens, a dialog box for setting the color tone to be applied to the monochromatic image is displayed on the upper portion of the window, while a dialog box for setting the quantity of application of the color tone is displayed on the lower portion of the window.

The procedure of setting the color tone in the upper dialog box on the window is described first. The printer 20 of this embodiment is provided with the M ink and the Y ink as the chromatic color inks and may thus apply any arbitrary color tone in the range of magenta to yellow to the monochromatic image. For example, adjusting an arrow at a position 'Magenta' in the dialog box causes the magenta tone to be applied to the monochromatic image. Adjusting the arrow at a position in the vicinity of an indication 'Sepia' in the dialog box causes the sepia color tone corresponding to the position of the arrow to be applied to the monochromatic image.

The lower dialog box on the window sets the quantity of application of the color tone, which is set in the upper dialog box on the window. The user shifts an arrow in the dialog box to a desired position to set the quantity of application of the color tone to a desired level. For example, adjusting the arrow at a position with an indication 'No Application' specifies setting of a simple black and white image with no application of the color tone. The monochromatic image is gradually changed from the simple black and white image to the color-toned image with a rightward shift in position of the arrow. Adjusting the arrow at an appropriate position enables a desired level to be set to the quantity of application of the color tone applied to the monochromatic image.

The color tone application process (step S106) shown in FIG. 5 generates the dot density data of the M dot and the dot density data of the Y dot, based on the settings of the color tone.

Figure 8:
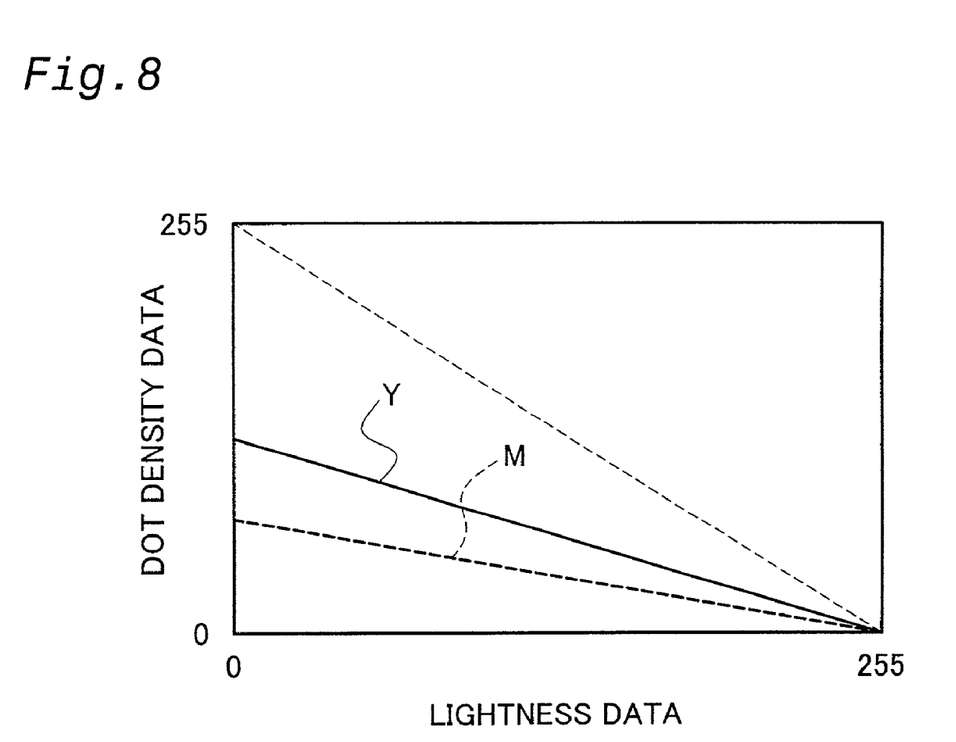
FIG. 8 conceptually shows creation of dots with chromatic color inks by the color tone application in the first embodiment.

FIG. 8 shows generation of the dot density data of the M dot and the dot density data of the Y dot against the lightness data of the image. As illustrated, at the tone value '255' of the lightness data, both the dot density data of the M dot and the dot density data of the Y dot have a tone value '0'. The tone value of the dot density data linearly increases with a decrease in tone value of the lightness data and reaches its maximum at the tone value '0' of the lightness data.

The ratio of the dot density data of the M dot to the dot density data of the Y dot is fixed, irrespective of the value of the lightness data. This ratio depends upon the color tone preset in the printer driver 92 as discussed previously with reference to FIG. 7. In the example of FIG. 7, the settings specify application of the 'Sepia' color tone to the monochromatic image. The dot density data of the Y dot is accordingly greater than the dot density data of the M dot in the settings of FIG. 8. When the settings of FIG. 7 specify application of the 'Warm' color tone, the dot density data of the Y dot is substantially equal to the dot density data of the M dot.

For the setting of the quantity of the color tone application mentioned above with reference to FIG. 7, the absolute value of the greater dot density data between the dot density data of the M dot and the dot density data of the Y dot is determined at the value '0' of the lightness data. For example, in the example of FIG. 7, the arrow for setting the quantity of the color tone application is located on a substantial center. The greater dot density data (in this example, the dot density data of the Y dot) accordingly has a tone value of about '128' at the position of the value '0' of the lightness data in the settings of FIG. 8. If the arrow for setting the quantity of the color tone application is located on a right end with an indication 'Large' as shown by the thin broken line in FIG. 7, the dot density data of the Y dot is set as shown by the thin broken line in the map of FIG. 8. The dot density data of the M dot is set to keep a preset ratio to such setting of the dot density data of the Y dot.

In the manner discussed above, the color tone application process carried out at step S106 in FIG. 5 generates the dot density data of the M dot and the dot density data of the Y dot according to the preset color tone and the quantity of application of the color tone. In the map of FIG. 8, both the dot density data of the M dot and the dot density data of the Y dot are linearly increased with a decrease in lightness data. Such a linear increase is, however, not necessary. In order to generate a monochromatic image of the better picture quality, the dot density data of the M dot and the dot density data of the Y dot may be increased non-linearly while keeping a fixed ratio.

On completion of the color tone application process, the printer driver carries out a tone number conversion process (step S108) in the following manner. As described above, the dot density data has 256 tones in a tone value range 0 to 255. In practice, however, there are only two states, 'dot-on' state and 'dot-off' state representing creation and non-creation of a dot on the printing paper. It is thus required to convert the dot density data having 256 tones into 2-tone data corresponding to the dot-on state and the dot-off state. The tone number conversion process accordingly converts the dot density data of 256 tones into the image data representing the dot on-off state. A diversity of known methods are applicable for the tone number conversion process. In this embodiment, the error diffusion method is used for the tone number conversion process, although any other known technique is also applicable.

Subsequent to the tone number conversion process, the printer driver carries out an interlacing process (step S110). The interlacing process rearranges the image data, which has been converted into the specific format based on the dot on-off state, in an order to be transferred to the printer 20 by taking into account the sequence of actual dot creation with the printer 20. The printer driver outputs the resulting image data obtained by the interlacing process as print data to the printer 20 (step S112). The printer 20 creates dots of the various inks on the printing paper according to the print data, so that a monochromatic image corresponding to the image data is printed on the printing paper.

As described above, the printing system of this embodiment creates dots of the M ink and the Y ink at a preset ratio in addition to dots of the achromatic color inks, so as to print a monochromatic image with a desired color tone like the sepia or warm color tone. The printer 20 is provided with the three inks K1, K2, and K3 having the different densities as the achromatic color inks and creates dots of these achromatic color inks to print a high-quality black and white image in which the dots are inconspicuous. The printing system of this embodiment applies the desired color tone to such a high-quality black and white image and thereby ensures a printed monochromatic image having the higher picture quality.

A-3. Modifications

The printer 20 of the first embodiment discussed above is provided with the M ink and the Y ink as the chromatic color inks. This combination is not restrictive, but the chromatic color ink may be a combination of the C ink and the M ink or only a single C, M, or Y ink. An appropriate special color ink like green ink or sepia ink may be used as the chromatic color ink.

Multiple inks having different densities may be used as the chromatic color inks. A lower-density ink is used to create dots in an image area of high lightness (that is, in a bright image area). For example, dots may be created with the low-density ink in a specific area where dots of the chromatic color inks are rather conspicuous. This arrangement preferably prevents deterioration of the picture quality due to the conspicuous dots of the chromatic color inks and thereby ensures a printed monochromatic image having the higher picture quality.

B. Second Embodiment

The printer 20 of the first embodiment is provided with the three achromatic color inks K1, K2, and K3 and the two chromatic color inks M and Y. The main difference from the first embodiment is that a printer 120 of a second embodiment is provided with three inks C, M, and Y as the chromatic color inks. The following describes the printer 120 of the second embodiment.

B-1. Construction of Apparatus

The printer 120 of the second embodiment is provided with the three achromatic color inks, K1 ink, K2 ink, and K3 ink as well as three chromatic color inks, C ink, M ink, and Y ink. The achromatic color inks are kept in the ink cartridge 42, whereas the chromatic color inks are kept in the ink cartridge 43. The printer 120 has an ink ejection head 49 for the color C, in addition to the ink ejection heads 44 through 48 for the respective colors K1, K2, K3, M, and Y.

Figure 9:
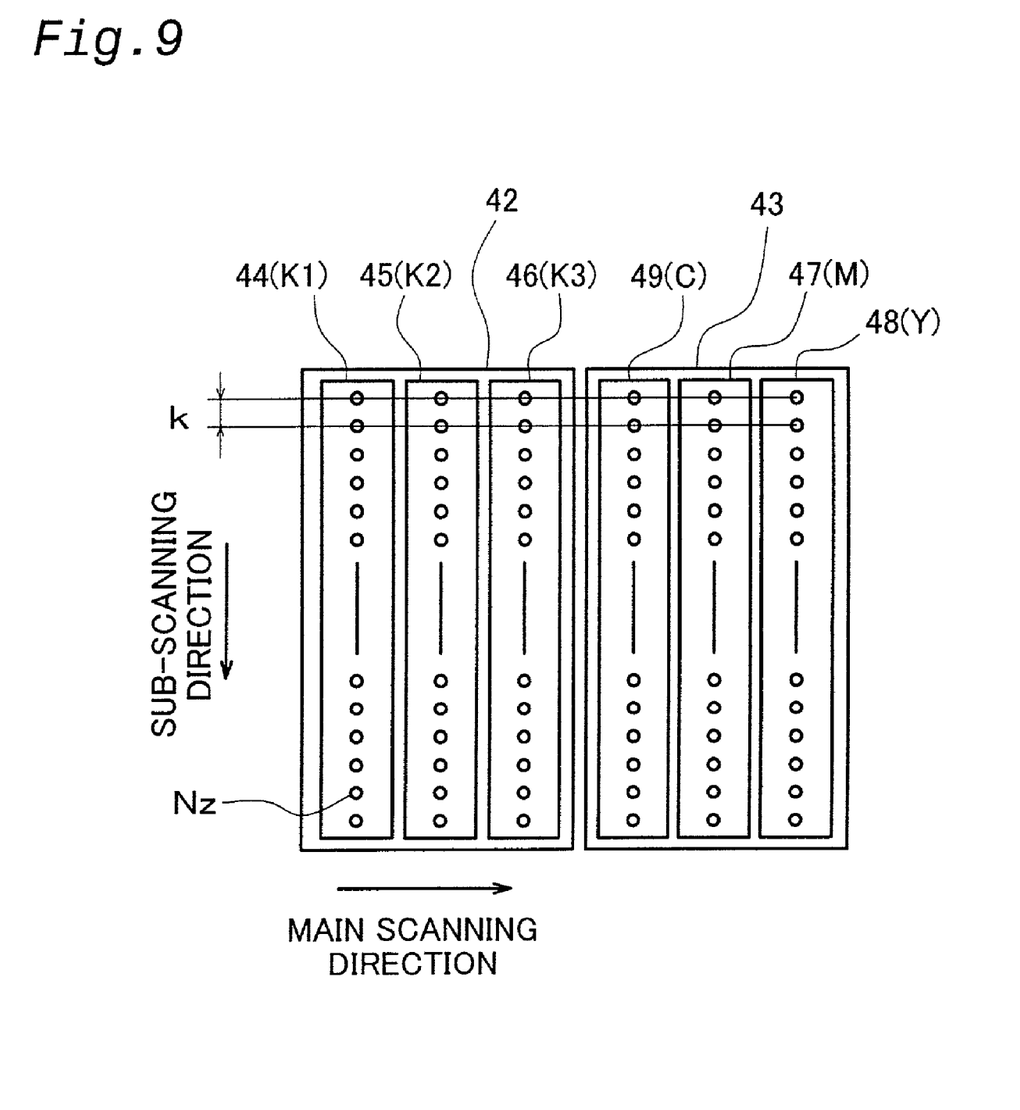
FIG. 9 shows an arrangement of nozzles in a printer of a second embodiment.

FIG. 9 shows a nozzle arrangement in the printer 120 of the second embodiment. As illustrated, six nozzle arrays for ejecting the K1, K2, K3, M, Y, and C inks are formed in the bottom face of the respective ink ejection heads. Each nozzle array has 48 nozzles Nz arranged at a fixed nozzle pitch k.

B-2. Image Processing

As described above, the printer 120 of the second embodiment additionally has the C ink as the new chromatic color ink, compared with the printer 20 of the first embodiment. This allows selection of the color tone to be applied in a wider range and ensures a printed monochromatic image of the high picture quality. The printer 120 of the second embodiment is provided with the C, M, and Y inks and may accordingly be used as a general color printer by means of mixed creation of dots of these chromatic color inks at adequate densities. The following describes a series of image processing carried out in the printing system of the second embodiment.

Figure 10:
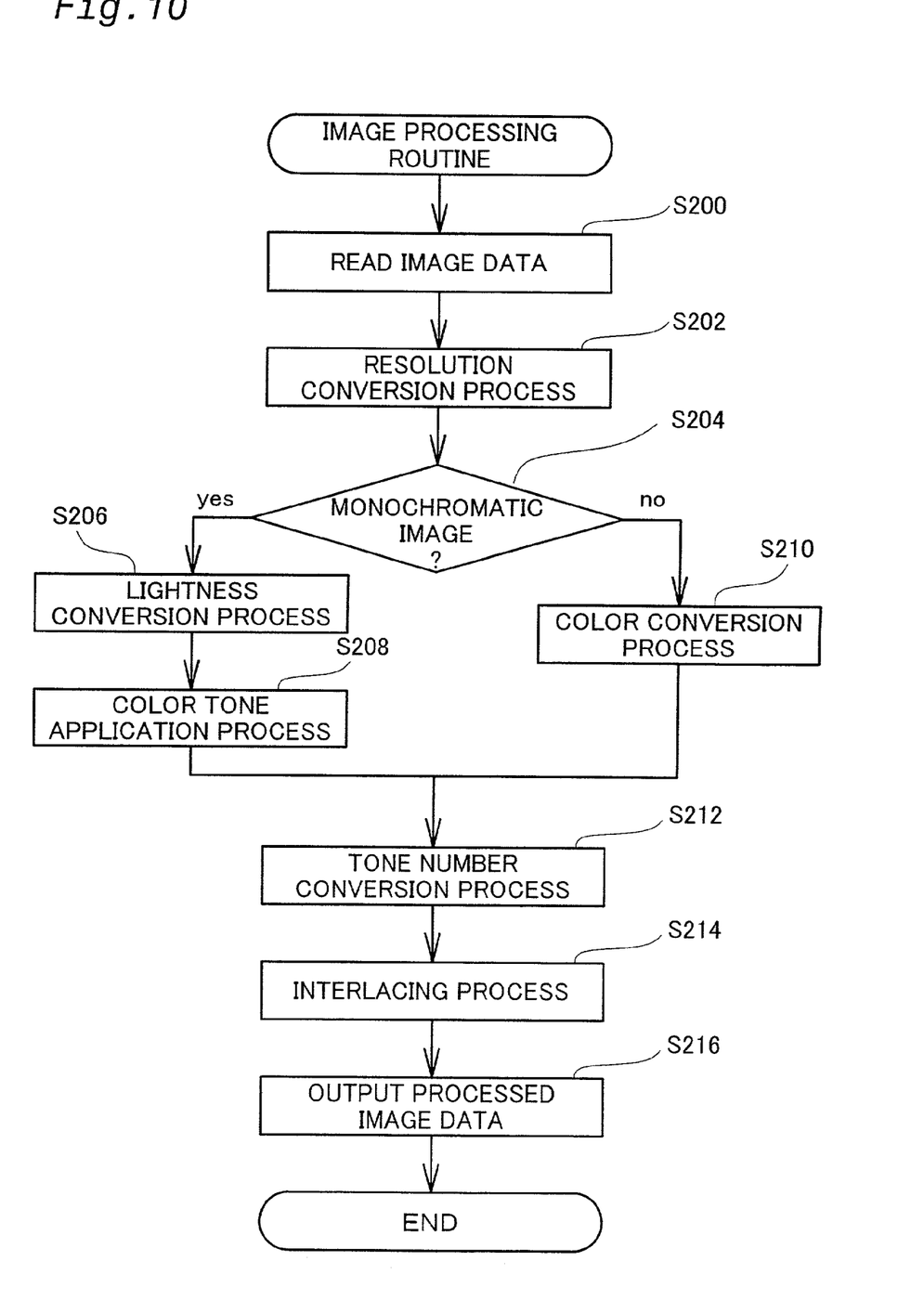
FIG. 10 is a flowchart showing an image processing routine executed in the second embodiment.

FIG. 10 is a flowchart showing an image processing routine executed in the second embodiment. The main difference from the image processing routine of the first embodiment is that the image processing routine of the second embodiment has a part applicable to print a color image. The image processing of the second embodiment, especially this part is discussed below.

In the second embodiment, the image processing routine first reads image data of interest to be converted (step S200) and converts the resolution of the input image data into a printing resolution for printing with the printer 120 (step S202).

After conversion of the resolution, the routine determines whether or not an image of interest to be printed is a monochromatic image (step S204). Selection of either the monochromatic image or the color image as an image to be printed is specified in advance in the printer driver. The determination at step S204 is based on such setting. In the case of selection of the monochromatic image (step S204: yes), the routine carries out a lightness conversion process (step S206) and a color tone application process (step S208) like the first embodiment. In the case of printing the monochromatic image, like the first embodiment, the color tone to be applied to the monochromatic image is set in advance in the printing system of the second embodiment. The printing system of the second embodiment utilizes the three chromatic color inks C, M, and Y and thus enhances the degree of freedom in setting of the color tone, compared with the printing system of the first embodiment. The color tone to be applied to the monochromatic image is set according to the following procedure.

Figure 11:
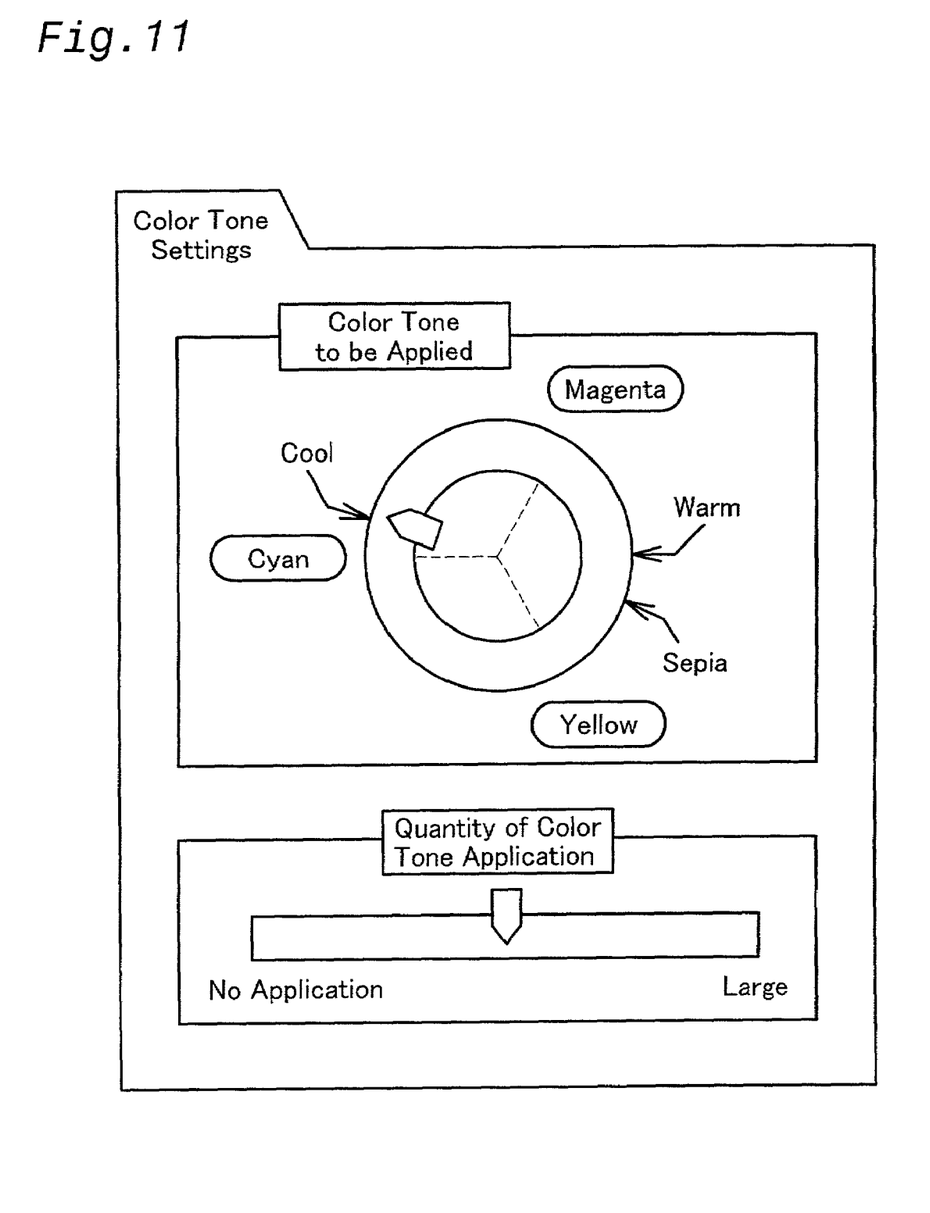
FIG. 11 shows settings of the color tone applied to a monochromatic image in the second embodiment.

FIG. 11 shows settings of the color tone to be applied to the monochromatic image in the printing system of the second embodiment. In the second embodiment, when a color tone setting window of the printer driver 92 opens, a dialog box for setting the color tone to be applied to the monochromatic image is displayed on the upper portion of the window, while a dialog box for setting the quantity of application of the color tone is displayed on the lower portion of the window. Only the upper dialog box on the window is different from the window of the first embodiment. The setting in this dialog box id described below.

As described previously with reference to FIG. 7, the color tone setting window of the first embodiment specifies the color tone to be applied to the monochromatic image by means of the arrow for setting the color tone located at an adequate position between 'Magenta' and 'Yellow'. In the structure of the second embodiment, on the other hand, the arrow may be located at an adequate position between 'Cyan', 'Magenta', and 'Yellow'. In the example of FIG. 11, the arrow is adjusted at a position between 'Cyan' and 'Magenta' but closer to 'Cyan'. The cyan color tone with a touch of magenta is set as the color tone to be applied to the monochromatic image. This color tone applied to the monochromatic image is generally called 'cool' tone as shown in FIG. 11.

In the image processing routine of the second embodiment, the color tone application process (step S208 in FIG. 10) generates dot density data of the C dot, the M dot, and the Y dot according to the color tone and the quantity of the color tone application set on the window of FIG. 11. The concrete procedure of generating the dot density data is identical with that of the first embodiment with addition of the C dot, and is thus not specifically described here.

When it is determined at step S204 in FIG. 10 that the image to be printed is not a monochromatic image (step S204: no), on the other hand, the routine carries out a color conversion process (step S210). The color conversion process converts the RGB image data read at step S200 into tone data of respective color inks used in the printer, for example, C, M, and Y. An LUT referred to in the color conversion process of this embodiment stores dot density data of the respective color inks, in order to cause each color specified by a combination of the tone values of the R, G, and B colors to be expressed by a combination of the C, M, Y, K1, K2, and K3 colors. The processing of step S204 in FIG. 10 refers to the LUT and quickly converts the RGB image data into the dot density data of the respective colors C, M, Y, K1, K2, and K3.

On completion of either the color tone application process (step S208) or the color conversion process (step S210), the routine carries out a tone number conversion process (step S212) and an interlacing process (step S214), and outputs the resulting processed data as print data to the printer 120 (step S216). The tone number conversion process and the interlacing process are identical with those of the first embodiment and are thus not specifically described here. The printer 120 creates dots of the respective color inks according to the resulting print data and prints either a monochromatic image or a color image.

As described above, the printing system of the second embodiment is provided with the three inks C, M, and Y as the chromatic color inks and has the significantly enhanced degree of freedom in setting of the color tone to be applied to the monochromatic image, compared with the printing system of the first embodiment, thus ensuring a printed monochromatic image of the higher picture quality. The printing system of the second embodiment provided with the C, M, and Y color inks is also capable of printing color images by means of mixed creation of dots of the respective color inks at adequate densities, like the general color printer.

The above embodiments and their modifications are to be considered in all aspects as illustrative and not restrictive. There may be many modifications, changes, and alterations without departing from the scope or spirit of the main characteristics of the present invention. For example, a software program (application program) attaining the above functions may be supplied to the main memory of the computer system or an external storage device via a communication line for execution. Alternatively the software program stored in a CD-ROM or a floppy disk may be read and executed.

In the embodiments discussed above, the size of the dots created on the printing paper is fixed. The technique of the present invention is also applicable to printers that are capable of regulating the size of dots created on the printing paper, such as variable dot printers.

In the respective embodiments discussed above, the image data conversion process is executed in the computer. Part or all of the image data conversion process may alternatively be executed in the printer or in a single-purpose image processing apparatus.

What is claimed is:

1. A printing apparatus that is provided with multiple achromatic color inks having different densities and creates a diversity of dots with the multiple achromatic color inks on a printing medium according to image data, thus printing a monochromatic image, said printing apparatus comprising:
    a chromatic color ink receiver that receives at least one chromatic color ink;
    a monochromatic hue setting module that sets a monochromatic hue that a monochromatic image has as a whole when carrying out monochromatic printing; and
    a chromatic color dot creation module that creates dots with the at least one chromatic color ink at a predetermined density according to lightness information included in the image data, the chromatic color dot creation module further creating dots with at least one achromatic color ink of multiple achromatic color inks having different densities, wherein the dots created with the at least one chromatic color ink are configured to be mixed with the dots created with the at least one of the multiple achromatic color inks so that a printed image has the monochromatic hue set by the monochromatic hue setting module.

2. A printing apparatus in accordance with claim 1, wherein said chromatic color ink receiver a first chromatic color ink and a second chromatic color ink having different hues, and
    wherein said chromatic color dot creation module creates dots with the first chromatic color ink and dots with the second chromatic color ink, such that a ratio of a density of the dots with the first chromatic color ink to a density of the dots with the second chromatic color ink is substantially fixed.

3. A printing apparatus in accordance with claim 1, wherein said chromatic color ink receiver receives at least cyan ink, magenta ink, and yellow ink.

4. A printing apparatus in accordance with claim 1, wherein the multiple achromatic color inks include three inks having different densities.

5. A printing apparatus in accordance with claim 1, wherein a number of the multiple achromatic color inks is equal to or greater than a number of the at least one chromatic color ink.

6. An image processing apparatus that converts image data into an expression format based on an on-off state of various types of dots, said image processing apparatus comprising:
    an achromatic color dot creation determination module that determines an on-off state of multiple types of achromatic color dots having different densities, based on the image data;
    a monochromatic hue setting module that sets a monochromatic hue that a monochromatic image has as a whole when carrying out monochromatic printing; and
    a chromatic color dot creation module that creates at least one type of chromatic color dots at a predetermined density according to lightness information included in the image data, the chromatic color dot creation module further creating multiple types of achromatic color dots having different densities, wherein the at least one type of chromatic color dots is configured to be mixed with at least one of the multiple types of achromatic color dots so that a printed image has the monochromatic hue set by the monochromatic hue setting module.

7. An image processing apparatus in accordance with claim 6, wherein said chromatic color dot creation module creates first chromatic color dots and second chromatic color dots having different hues, such that a ratio of a density of the first chromatic color dots to a density of the second chromatic color dots is substantially fixed.

8. An image processing apparatus in accordance with claim 7, said image processing apparatus further comprising:
    a density ratio setting module that sets the ratio of the density of the first chromatic color dots to the density of the second chromatic color dots,
    wherein said chromatic color dot creation module creates the first chromatic color dots and the second chromatic color dots at the ratio set by said density ratio setting module.

9. An image processing apparatus in accordance with claim 6, said image processing apparatus further comprising:

a density setting module that specifies a value of the predetermined density, at which the at least one type of chromatic color dots are created, wherein said chromatic color dot creation module creates the at least one type of chromatic color dots at the value of the predetermined density specified by said density setting module.

10. An image processing apparatus in accordance with claim 6, said image processing apparatus further comprising:

a density ratio setting module that sets a ratio of a density of cyan dots, a density of magenta dots, and a density of yellow dots to one another, wherein said chromatic color dot creation module creates the cyan dots, the magenta dots, and the yellow dots at the ratio set by said density ratio setting module.

11. An image processing method that converts image data into an expression format based on an on-off state of various types of dots, said image processing method comprising the steps of:

determining an on-off state of multiple types of achromatic color dots having different densities, based on the image data;

setting a monochromatic hue that a monochromatic image has as a whole when carrying out monochromatic printing; and creating at least one type of chromatic color dots at a predetermined density according to lightness information included in the image data and creating multiple types of achromatic color dots having different densities, wherein the at least one type of chromatic color dots is configured to be mixed with at least one of the multiple types of achromatic color dots so that a printed image has the monochromatic hue set by the monochromatic hue setting module.

12. A computer program embodied on a computer readable medium for converting image data into an expression format based on an on-off state of various types of dots, said computer program comprising:

program instructions for determining an on-off state of multiple types of achromatic color dots having different densities, based on the image data;

program instructions for setting a monochromatic hue that a monochromatic image has as a whole when carrying out monochromatic printing; and program instructions for creating at least one type of chromatic color dots at a predetermined density according to lightness information included in the image data and creating multiple types of achromatic color dots having different densities, wherein the at least one type of chromatic color dots is configured to be mixed with at least one of the multiple types of achromatic color dots so that a printed image has the monochromatic hue set by the monochromatic hue setting module.

* * * * *